UNITED STATES PATENT OFFICE.

DITTMAR FINKLER, OF BONN, GERMANY.

FOOD PRODUCT.

966,324. Specification of Letters Patent. Patented Aug. 2, 1910.

No Drawing. Original application filed June 22, 1906, Serial No. 322,928. Divided and this application filed August 14, 1909. Serial No. 512,847.

*To all whom it may concern:*

Be it known that I, DITTMAR FINKLER, a subject of the Emperor of Germany, and resident of Bonn, Germany, have invented a certain new and useful Improved Food Product, of which the following is a specification.

In the grinding of cereals it has been found practically impossible to render the entire nutrient contents available for digestion for the reason that the bran of cereals or the covering walls of legumes and other seed and vegetable substances contain cells of indigestible matter which entirely inclose small bodies of albumen, which latter, as long as the cell walls remain unbroken, cannot be reached by the digestive juices. In my application for Letters Patent of the United States, filed June 22, 1906, Ser. No. 322,928, I have described various ways of so comminuting the bran of cereals and equivalent vegetable substances that the indigestible unbroken cell walls above referred to will be broken and the albumen contained therein liberated.

My present application, which is a division of the above mentioned case, relates to the product.

One way of carrying out my invention is as follows: I first separate the bran from the kernel of the seed. The bran is then impregnated with a solution of sodium chlorid and disintegrated by bruising, grinding, or beating it in such a way that the gluten cell walls burst open and are emptied of their nutritive contents, mainly albumen. I have found that good results are obtained if the bran is mixed with a 10% solution of sodium chlorid in water, and left to stand for a time. Of course a weaker solution than 10% may be used. The mixture is then ground to a fine paste until the bran cells are opened, the albumen liberated and the whole matter further and thoroughly ground. The ground material may then be washed, if desired, the mass then dried and if necessary ground again.

The result of this treatment is a breaking of the gluten walls of the cells containing nutritive matter, chiefly albumen. The final mass or flour resulting from the treatment described is therefore characterized by the presence therein of broken gluten cell walls which are digestible, whereas ordinary bran flour contains these gluten cells unbroken and indigestible.

Bran which has been heretofore considered a product of inferior value is by my process rendered as valuable as ordinary flour, which is made from the kernel alone. In addition it furnishes more nutrients to the body and is even easier digestible than ordinary flour, facts which the following will explain: That part of the cereal, generally called bran, contains more albumen than the rest of the cereal. This albumen until now has been lost as a nutrient. So called bran flour as obtained heretofore did not have its cells broken and its nutrient set free. To illustrate: What I mean to render clear is that, since the cell walls of bran have not heretofore been broken open, to discharge their nutritious contents, the entire mass was practically indigestible. Tests made by me with bread made of so called ground bran prove that about 50 per centum of nutrient in that bread is not and cannot be digested. But once the bran cells are burst open deliberately and thoroughly, their nutritious contents reach contact with the gastric juices are thoroughly digested and even the glutinous bran cells thus broken have become largely digestible, so that bread made from my bran flour is almost wholly digested, leaving at most about 10 per cent. of undigested nutrient. When my bran flour is mixed with the ordinary white kernel flour, a bread is produced which is far more nutritious than any bread heretofore made.

When I mention bran in this specification and in the claims, I mean the uncooked or raw bran of cereals or the respective covering of seeds, legumes and other vegetable food substances; and when I speak of bran flour, I refer to such bran when ground and when substantially free from unbroken cells.

I claim:

1. The herein described food product consisting of raw bran flour composed of comminuted broken and empty gluten cells and their former nutritive contents and substantially free from unbroken cells, as described.

2. The herein described food product consisting of bran flour in a raw state, the same being composed of comminuted broken and empty gluten cells and their former nutritive contents, also comminuted and substantially free from unbroken cells, as described.

In testimony whereof I have hereunto set my hand in the presence of two subscribing witnesses.

DITTMAR FINKLER.

Witnesses:
M. KNEPPERS,
L. VANDORN.